United States Patent [19]

Sczomak

[11] Patent Number: 4,750,675
[45] Date of Patent: Jun. 14, 1988

[54] DAMPED OPENING POPPET COVERED ORIFICE FUEL INJECTION NOZZLE

[75] Inventor: David P. Sczomak, Troy, Mich.

[73] Assignee: General Motors Corporation, Detroit, Mich.

[21] Appl. No.: 104,254

[22] Filed: Oct. 5, 1987

[51] Int. Cl.$^4$ ............................................... B05B 1/32
[52] U.S. Cl. ..................... 239/453; 239/533.3; 239/533.11
[58] Field of Search ........ 239/453, 452, 533.3–533.12, 239/88

[56] References Cited

U.S. PATENT DOCUMENTS

| 2,035,203 | 3/1936 | Smith | 239/533.6 X |
|---|---|---|---|
| 2,096,814 | 10/1937 | Laessker | 239/453 |
| 2,521,224 | 9/1950 | Kammer | 239/88 |
| 2,592,111 | 4/1952 | Bischof | 239/452 X |
| 2,901,185 | 8/1959 | Dickey | 239/453 |
| 3,718,283 | 2/1973 | Fenne | 239/533.4 |
| 4,034,917 | 7/1977 | Bailey | 239/533.7 X |
| 4,082,224 | 4/1978 | Margus | 239/533.12 X |
| 4,662,338 | 5/1987 | Itoh et al. | 239/453 X |
| 4,693,424 | 9/1987 | Sczomak | 239/453 |

FOREIGN PATENT DOCUMENTS 542371 1/1942 United Kingdom ............... 239/453

Primary Examiner—Andres Kashnikow
Assistant Examiner—Mary Beth O. Jones
Attorney, Agent, or Firm—Arthur N. Krein

[57] ABSTRACT

A poppet covered orifice fuel injector nozzle for use in a direct injection type diesel engine has a spray tip with a spring biased poppet valve journaled for reciprocable movement therein, the lower reduced diameter free end of the spray tip and the head of the poppet valve having opposed frusto-conical valve seat surfaces with a differential angle of about 2° so that seating engagement occurs at the outer peripheral edges thereof. The poppet valve has a fuel supply passage extending through the stem thereof for flow communication with a plurality of circumferentially spaced apart radial orifices that are inclined and located so as to discharge fuel parallel to and directly across the valve seat surface of the poppet valve. A retainer is sealingly fixed to the free stem end of the poppet valve and a damping piston encircles the stem of the poppet valve in position to cooperate with the retainer for one-way damping of valve movement in a valve opening direction.

2 Claims, 1 Drawing Sheet

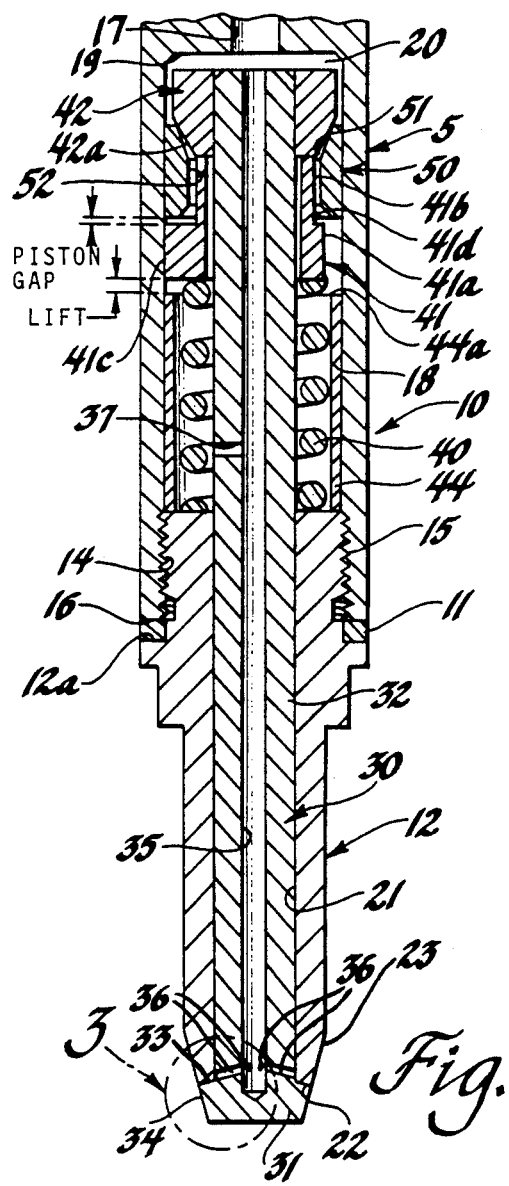
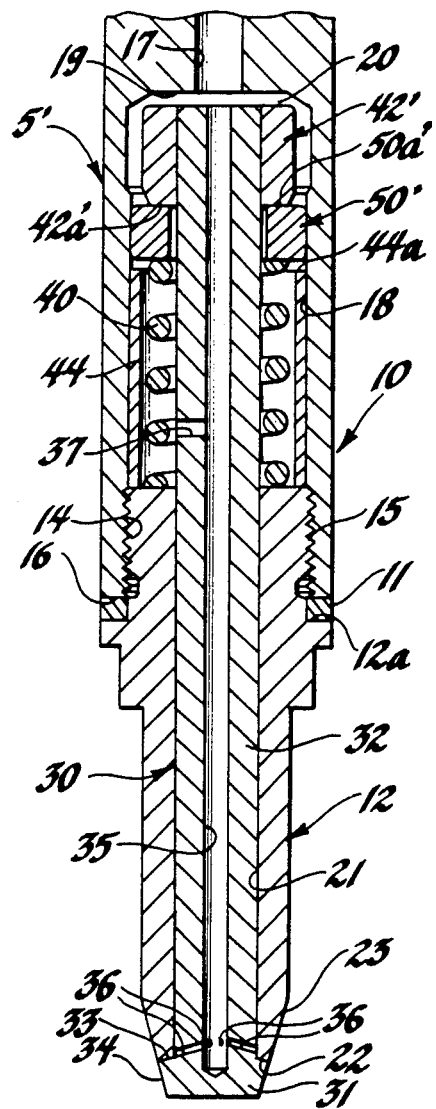
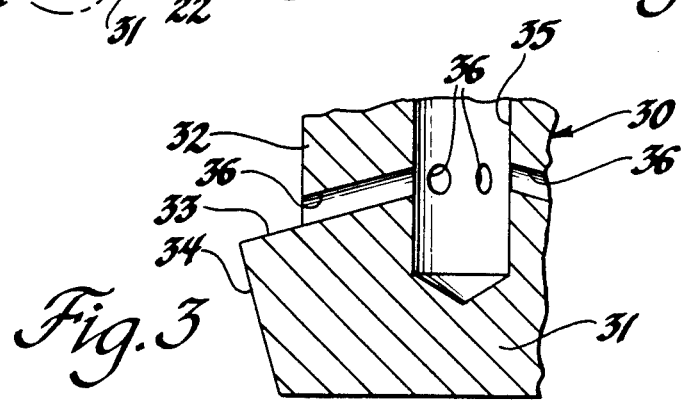

DAMPED OPENING POPPET COVERED ORIFICE FUEL INJECTION NOZZLE

FIELD OF THE INVENTION

This invention relates to liquid fuel injection nozzles for internal combustion engines and, in particular, to such an injection nozzle of the outward damped opening poppet valve type for use in a direct injection type diesel engine.

DESCRIPTION OF THE PRIOR ART

Fuel injection nozzles of the outward opening, poppet valve type for use in diesel engines are well known. In this type of injection nozzle, there is provided a closure member, in the form of a poppet valve, that is movable to an open position relative to an associate valve seat by a high pressure pump, and that is movable to its closed position in seating engagement with the valve seat by a spring acting on a collar positioned so as to loosely encircle the stem of the poppet valve whereby it can abut against an enlarged head at the inner end of the stem of the poppet valve.

Exemplary embodiments of such fuel injection nozzles that have spray discharge orifices associated with the poppet valve that are uncovered upon opening movement of the poppet valve are disclosed, for example, in U.S. Pat. No. 2,521,224, entitled "Pilot Fuel Injector", issued Sept. 5, 1950 to George S. Kammer and in U.S. Pat. No. 4,082,224, entitled "Fuel Injection Nozzle", issued Apr. 4, 1978 to Ervin E. Mangus.

However, because of current and future emission standards, all such prior known fuel injection nozzles appear to be unsuitable for use in direct injection type diesel engines because of poor injected fuel penetration at light engine loads, which can also result in high smoke levels.

Accordingly, an improved poppet covered orifice fuel injection nozzle of the outward opening, poppet valve type has been disclosed in Applicant's U.S. patent application Ser. No. 889,259 filed July 23, 1986, now U.S. Pat. No. 4,693,424, issued Sept. 15, 1987, wherein the arrangement is such that the stem of the poppet valve has a fuel passage therein to supply fuel to circumferentially spaced apart relatively fluid dynamically thick radial discharge orifices that are located and inclined so as to discharge fuel parallel to and directly across the frusto-conical seating surface of the head of the poppet valve which in turn is adapted to seat against the outer edge of a frusto-conical valve seat encircling the lower discharge end of the spray tip body of the injection nozzle.

SUMMARY OF THE INVENTION

It is therefore, a primary object of the present invention to provide an improved damped opening, only, fuel injection nozzle for use in direct injection type diesel engines that is operable in a manner whereby to substantially eliminate carbon build-up on the cooperating spray discharge elements thereof without affecting the spray pattern of the fuel being discharged therefrom by the use of a poppet valve and an arrangement of spray orifices whereby the spray orifices are covered upon closure of the poppet valve, a damping piston being used to reduce the initial rate of injection so as to reduce engine noise and emissions.

Accordingly, another object of the invention is to provide an improved damped opening fuel injection nozzle of the outward opening, poppet valve type wherein the stem of the poppet valve has a fuel passage therein to supply fuel to circumferentially spaced apart relatively fluid dynamically thick radial discharge orifices that are located and inclined so as to discharge fuel parallel to and directly across the frusto-conical seating surface of the head of the poppet valve which in turn is adapted to seat against the outer edge of a frusto-conical valve seat encircling the lower discharge end of the spray tip body of the injection nozzle, a damping piston being associated with the poppet valve to slow the opening movement of the poppet valve.

For a better understanding of the invention, as well as other objects and further features thereof reference is had to the following detailed description of the invention to be read in connection with the accompanying drawings.

BRIEF DESCRIPTION OF THE DRAWINGS

FIG. 1 is an enlarged longitudinal, cross-sectional view of a preferred embodiment of a fuel injection nozzle constructed in accordance with the invention, showing the upper tube like fitting thereof partly in elevation;

FIG. 2 is an enlarged longitudinal, cross-sectional view, similar to FIG. 1, but showing an alternate embodiment of a fuel injection nozzle constructed in accordance with the invention; and FIG. 3 is a further enlarged cross-sectional view of a portion of the poppet valve, per se, of an injection nozzle taken at the circle 3 of FIG. 1.

DESCRIPTION OF THE EMBODIMENTS

Referring now first to FIG. 1, there is illustrated a preferred embodiment of an outward opening, poppet covered orifice fuel injection nozzle, generally designated 5; constructed in accordance with the invention. The fuel injection nozzle 5 is of a type that is adapted to be mounted, for example, in a suitable nozzle receiving socket formed for this purpose in the cylinder head, not shown, of a direct injection type diesel engine with the spray tip end thereof suitably located so as to discharge fuel into an associated combustion chamber of the engine, the injection nozzle 5 being adapted to be axially retained, for example, by a suitable yoke type clamp, not shown, in a manner well known in the art.

The poppet covered orifice fuel injection nozzle 5, in the construction illustrated is provided with a multi-piece nozzle housing that includes a tube-like inlet nut fitting 10 and a spray tip 12 suitably secured together in a conventional manner. Thus in the construction illustrated, the inlet nut fitting 10 is secured to the spray tip 12 by threaded engagement of the internal threads 14 thereof with the external threads 15 at the upper end of the spray tip 12, with reference to FIG. 1, whereby the upper end flange surface 12a of the spray tip 12 abuts against one side of a ring seal 11, the opposite side of seal 11 abutting against the lower face 16 of the inlet nut fitting 10.

As shown, the nut fitting 10 is provided with an axial stepped bore therethrough to define a circular stepped upper wall 17 forming an inlet passage that extends downward from the upper or free end, not shown, of the fitting 10 so as to open at its other end into a cylindrical fuel chamber 20 defined in part by the circular internal wall 18 in the lower tubular portion of this inlet nut fitting 10. Walls 18 and 17 are interconnected by a flat shoulder 19.

In addition, the inlet fitting 10 at its upper end is provided with suitable external threads, not shown, whereby a fuel supply tube and associate tube coupling, both not shown, can be secured thereto so that the injection nozzle 5 can be intermittently supplied with fuel, for example, as by a high pressure distribution pump, not shown, in a conventional manner.

Spray tip 12, of stepped external cylindrical configuration, is provided with an axial bore therethrough so as to define a valve stem guide wall 21 of a predetermined internal diameter, which at its lower free end is encircled by a frusto-conical valve seat 22 of a predetermined included angle. As shown in FIG. 1, the lower outer peripheral end of the spray tip 12 is relieved as by a chamfer 23 so as to intersect the valve seat 22 and to define therewith a so-called knife edge whereby the valve seat 22 is of a predetermined maximum external diameter. Preferably, the chamfer is formed at an angle of about 15° to 20° relative to the axis of the spray tip.

Fuel discharge from the lower end of the spray tip 12 is controlled by means of an injection valve in the form of a poppet valve 30 that includes a head 31 with an elongated valve stem 32 extending therefrom, the lower portion of the valve stem being of a predetermined external diameter whereby it is reciprocably and sealingly guided by the valve stem guide wall 21 and which is of an axial extent so as to extend loosely into the fuel chamber 20 but axially spaced apart from shoulder 19, when the poppet valve 30 is in a valve closed position as shown in FIG. 1.

The head 31 of the poppet valve 30 is preferably of a predetermined maximum external diameter corresponding to the external diameter of the valve seat 22 and is provided with an annular frusto-conical valve seat surface 33 formed complementary to valve seat 22 but with a predetermined included angle such that preferably the valve seat 22 and valve seat surface 33 effect seating engagement at least at one and preferably at both their outer peripheral edges. Preferably, as shown, the head 31 below the valve seat surface 33 is also provided with a chamfer 34 formed complementary to the chamfered 23 lower end of the spray tip 12.

However, because of the usual manufacturing tolerance encountered in mass production of injection nozzles, some overlap of the valve seat surface 33 of the poppet valve 30 relative to the valve seat 22 can be tolerated. Accordingly, in a particular injection nozzle application, the poppet valve 30 is selectively mated to a spray tip 12, such that the valve seat surface 33 of its head 31 can overhang the valve seat 22 of the spray tip 12 by a maximum of 0.01 mm or the valve seat of the spray tip 12 can overhang the valve seat surface 33 of the poppet valve head 31 by a maximum of 0.01 mm. However, in another preferred injection nozzle application, the assembly of the poppet valve 30 and spray tip 12 is ground on its outside peripheral surface, as necessary to ensure zero overhang of the poppet valve 30 and spray tip 12.

The reason for limiting such overhang is due to the fact that any exposed surface radially outward of the actual sealed interface of the valve seat 22 and valve seat surface 33 can and will be wetted by fuel during the injection cycle and fuel thus collected on such exposed wetted surfaces can result in high hydrocarbon emissions during the combustion process then occurring in the associated combustion chamber, not shown. Thus it is desirable to reduce such surface area which can be wetted by fuel to a minimum. In addition, with the chamfered spray tip 12 and head 31 arrangement shown, it appears that any carbon deposit which may engage any exposed valve seating surface either will fall off and/or burn off more readily due to the preferred range of the chamfer angle described hereinabove.

Preferably the differential angle between the included angles of the valve seat 22 and that of the valve seat surface 33, should be about or preferably less than 2°, whereby sealing will always occur at least at the outer edge of the valve seat 22 or at the outer edge of the valve seat surface 33 and, preferably at both their outer annular edges. Thus, by way of an example, in a particular application, the included angle of the valve seat 22 was 149°+15′ while that of the valve seat surface 33 was 151°. With this arrangement, the volume of fuel trapped outside of the fuel discharge orifices 36, described next hereinafter, yet inside of the valve seat engagement surfaces will be held to a minimum.

Extending axially through the stem 32 of the poppet valve 30 is an internal fuel passage 35 that is open at the upper free end of the valve stem for flow communication with the fuel in the fuel chamber 20 and which at its lower end is in flow communication with a plurality of circumferentially equally spaced apart, radially outward extending, and downwardly directed fuel discharge orifices 36 of predetermined diameters, as desired.

As best seen in FIG. 3, the axis of each such discharge orifice 36 is inclined at an angle parallel to the surface of the valve seat surface 33 on the head 31 of the poppet valve 30 and each such discharge orifice 36 is axially located so that the valve seat surface 33 is substantially tangent as close as possible to the lower outlet end of each such discharge orifice 36, as shown in this Figure, so as to provide for maximum fuel spray penetration upon opening movement of the poppet valve 30 during a fuel injection cycle.

For this reason and as described in the above-identified U.S. patent application Ser. No. 889,259, each of the discharge orifices 36 is relatively fluid dynamically thick, with preferably an L/D ratio in the order of 4 to 8, wherein L is the effective axial length of a discharge orifice and D is the diameter of the discharge orifice. Thus in a particular embodiment, each discharge orifice 36 had a nominal length L of 1.25 mm and an average diameter D of 0.194, with each discharge orifice 36 having an L/D ratio of approximately 6.4. Also as shown, the total cross-sectional flow area of the fuel passage 35 is made substantially greater than the combined cross-section flow area of the discharge orifices 36.

In addition, although the discharge orifices are illustrated as all of them having a small gap uniform between the lowest edge of the discharge orifice 36 and the corner of the valve seat surface 33 which may be on the order of about 0.05 mm or less, it should be realized, however, that for the purposes of controlling the discharge orifice area versus lift for a particular engine application, the height of the discharge orifices 36 may be staggered. In such a situation the highest discharge orifice 36 may be, for example, 0.15 mm above the corner of the valve seat surface 33 but, however, at least one or more of the discharge orifices 36 are still located approximately 0.05 mm above the corner of the valve seat surface 33 to insure penetrating fuel sprays as soon as the poppet valve 30 lifts from the valve seat 22.

In addition, the stem 32 of valve 30 is provided with at least one radial equalizing orifice 37 located so as to effect flow communication between passage 35 and the fuel chamber 20 whereby to prevent hydraulic locking of the nozzle assembly.

The poppet valve 30 is normally biased to a valve closed position relative to the valve seat 22, the position shown, by means of a valve return spring 40 loosely encircling a portion of the valve stem 32 within the fuel chamber 20. As shown, one end or lower end of the spring, which is of predetermined force, abuts against the upper end of the spray tip 12, while the opposite or upper end, with reference to FIG. 1, of the spring 40 abuts against the lower end of a tubular collar 41 which in turn abuts against the lower end of a tubular retainer 42 suitably fixed, as by a press fit or weld to the upper free end portion of the valve stem 32. The retainer 42 and collar 41 are each of cylindrical tubular configuration with each having an outside diameter suitably less than the internal diameter of the wall 18 in the inlet nut fitting 10 whereby they are loosely slidable therein.

With this arrangement, the retainer 42 is fixed to the valve stem 32 against axial movement relative thereto and in fluid tight engagement therewith. The collar 41 however is provided with, for example, circumferentially spaced apart flats 41a on its outer peripheral surface so as to define with the wall 18, a plurality of axial extending passages for the free flow of fuel therethrough. Also as shown, the collar 41 is thus positioned so as to abut at its lower end against the upper end surface 44a of a tubular lift stop 44 positioned in chamber 20 so as to be supported on the upper free end surface of the spray tip 12 whereby to limit opening movement of the poppet valve 30

As shown, the collar 41 is of stepped external configuration so as to define an upper reduced diameter portion 41b and a lower portion 41c having the flats 41a, these portion being interconnected by a flat shoulder 41d.

Now in accordance with the invention a tubular damping or damper piston 50 is positioned so as to loosely encircle the collar 41. The external diameter of the damper piston 50 is preselected relative to the internal diameter of wall 18 whereby there is provided a predetermined diametral clearance between these elements so as to prevent significant fuel flow through this clearance to thus dampen the motion of the valve 30 during opening movement of this valve 30.

As shown, the bore through the damping piston 50 preferably defines at least an upper inclined wall 51 of a predetermined angle relative to the inclined lower surface 42a of retainer 42 and a straight wall 52 of an internal diameter substantially greater than the external diameter of the upper portion 41b of collar 41.

As shown in FIG. 1, the effective axial extent of the damping piston 50 is preselected relative to the effective axial extent of collar 41 so that when the damping piston 50 sealingly abuts against the lower surface 42a of retainer 42, the position shown, a "piston gap" will exist between the lower end surface of the damping piston 50 and shoulder 41d of collar 41. As illustrated, the axial extent of this "piston gap" is a predetermined amount less than the preselected, axial extent of the valve 30 "lift". As should now be apparent, valve "lift" is controlled by engagement of the collar 41 against the lift stop 44 during opening movement of valve 30.

During operation, as pressurized fuel is supplied to the injection nozzle 5 at a pressure sufficient to cause opening movement of the valve 30, then as this valve 30 begins to open, the fuel which is, in effect, substantially trapped in the chamber 20 below the damping piston 50 will force the damping piston 50 to a position at which it is pressed upward into so-called sealing engagement against the retainer 42, the position shown in FIG. 1, so as to shut off any fuel flow between these elements. However, limited fuel flow can still occur in the flow path defined by the previously described diametral clearance so as to allow continued opening movement of the valve 30 at a controlled damped rate, as desired.

Thereafter, upon valve closing movement of valve 30, a gap opens between the damping piston 50 and the retainer 42, allowing fuel to flow from the portion of the chamber 20 above the damping piston 50 through this gap into the portion of the chamber 20 below the damping piston 50. Thus the closing movement of valve 30 is not damped. Accordingly, the subject arrangement provides for a "one-way" damping feature means, that is, the motion of valve 30 is damped only during opening movement of the valve 30. The size of this gap is controlled by the axial extent of the previously described "piston gap", which should be large enough to insure good flow between the damping piston 50 and retainer 42 during valve closing movement, but it must be small enough so that when the valve 30 re-opens, this gap is overcome before significant valve 30 lift takes place. In a particular injection nozzle application this "piston gap" was about 0.05 mm.

An alternate embodiment of an injection nozzle, generally designated 5', in accordance with the invention is shown in FIG. 2, wherein similar parts are designated by similar numerals but with the addition of a prime (') where appropriate.

In this injection nozzle 5', the collar 41 is not used and, instead, the spring 40 is positioned so as to act directly on the flat, tubular damping piston 50', whereby to normally bias its flat upper surface 50a' into substantial sealing engagement with the lower flat surface 42a' of retainer 42'.

Thus in this alternate embodiment injection nozzle 5' structure, the "one-way" only damping feature is dependent upon some gap separation between the damping piston 50' and retainer 42' during closing movement of the valve 30. During valve 30 opening movement, damping will occur in the same manner as previously described with reference to the injection nozzle 5.

By the use of a one-way damping piston 50, 50' to slow opening movement of the associate valve 30, the initial rate of fuel injection from an injection nozzle 5, 5' can be reduced while still permitting a fast closing movement of the associate valve 30. It will be appreciated by those skilled in the art, that this can be further enhanced, if desired for a given application, by staggering the discharge orifice 36 heights above the valve seat 33. Thus if two low "pilot" spray discharge orifices 36 are used, for example, the flow area at the beginning of injection can be limited to these discharge orifices 36 by damping the opening movement of the valve 30. Obviously, with no damping, the valve 30 can overshoot such "pilot" orifice holes and go to the full valve open position too rapidly.

While the invention has been described with reference to the structure disclosed herein, it is not confined to the details set forth, since various changes or modifications will be apparent to those skilled in the art.

The embodiments of the invention in which an exclusive property or privilege is claimed are defined as follows:

1. A poppet covered orifice fuel injector nozzle for use in a direct injection type diesel engine, said fuel injector nozzle including an injector body means having an inlet for pressurized fuel at one end thereof and having a spray tip at the opposite end thereof; said spray tip having a discharge free end and having an axial stepped through bore of predetermined internal diameter therein at its discharge free end with an annular frusto-conical valve seat encircling said bore at said discharge free end of said spray tip, said bore intermediate its ends defining an enlarged diameter fuel chamber in said injector body means an outward opening poppet valve operatively positioned in said injector body means, said poppet valve including an annular head with a frusto-conical valve seat surface positioned for movement between a closed position and an outward open position relative to said valve seat and a valve stem portion extending from said head that is slidably received in said bore and has its free end loosely received in said fuel chamber, said poppet valve having an internal passage means in fluid communication at one end with said inlet and terminating at its other end in circumferentially spaced apart radial orifices that are inclined and located so as to discharge fuel parallel to and substantially directly across said valve seat surface of said head and a radial passage interconnecting said passage means to said fuel chamber, a retainer means sealingly fixed to said valve stem at said free end thereof opposite said head, a valve lift stop means operatively located in said fuel chamber, a tubular damping piston loosely encircling said valve stem next adjacent to said retainer means within said fuel chamber and spring means operatively positioned in said fuel chamber and operatively associated with said poppet valve to normally bias said head of said poppet valve to said closed position; said frusto-conical valve seat and said valve seat surface together with said discharge free end of said spray tip being configured so that said valve seat surface will effect sealing engagement with said valve seat at substantially the outer peripheral edge thereof with substantially no overhang of these elements with respect to each other whereby to prevent fuel wetting during injection when said head is moved to said open position as controlled by said damping piston and to prevent fuel flow from said orifices when said head is in said closed position.

2. A poppet covered orifice fuel injector nozzle according to claim 1 further including a collar of stepped external configuration loosely encircling said valve stem between said spring means and a portion of said damping piston, said collar being adapted to engage said valve lift stop means whereby to control lift of said poppet valve.

* * * * *